(12) United States Patent
Wohlfeld et al.

(10) Patent No.: US 11,941,793 B2
(45) Date of Patent: Mar. 26, 2024

(54) ARTIFICIAL INTELLIGENCE BASED REGISTRATION SUPPORT FOR ENVIRONMENTAL SCANS

(71) Applicant: FARO Technologies, Inc., Lake Mary, FL (US)

(72) Inventors: Denis Wohlfeld, Ludwigsburg (DE); Heiko Bauer, Korntal-Münchingen (DE); Evelyn Schmitz, Korntal-Münchingen (DE)

(73) Assignee: FARO Technologies, Inc., Lake Mary, FL (US)

( * ) Notice: Subject to any disclaimer, the term of this patent is extended or adjusted under 35 U.S.C. 154(b) by 238 days.

(21) Appl. No.: 17/314,408

(22) Filed: May 7, 2021

(65) Prior Publication Data

US 2021/0366098 A1 Nov. 25, 2021

Related U.S. Application Data

(60) Provisional application No. 63/028,162, filed on May 21, 2020.

(51) Int. Cl.
*G06K 9/00* (2022.01)
*G06T 7/00* (2017.01)

(52) U.S. Cl.
CPC .. *G06T 7/0002* (2013.01); *G06T 2207/10028* (2013.01); *G06T 2207/20081* (2013.01)

(58) Field of Classification Search
CPC ......... G06T 7/0002; G06T 2207/10028; G06T 2207/20081
USPC ....................................................... 382/154
See application file for complete search history.

(56) References Cited

U.S. PATENT DOCUMENTS

| | | |
|---|---|---|
| 8,705,012 B2 | 4/2014 | Greiner et al. |
| 10,628,533 B2 | 4/2020 | Tonn et al. |
| 11,055,532 B2 | 7/2021 | Frank et al. |
| 2018/0040119 A1 | 2/2018 | Trenholm et al. |
| 2018/0204338 A1 | 7/2018 | Narang et al. |

(Continued)

OTHER PUBLICATIONS

Yang, Xiao, et al. "Quicksilver: Fast predictive image registration—a deep learning approach." NeuroImage 158 (2017): 378-396. (Year: 2017).*

(Continued)

*Primary Examiner* — Jonathan S Lee
(74) *Attorney, Agent, or Firm* — McCarter & English, LLP; Dave S. Christensen

(57) ABSTRACT

A method for automatically determining quality of registration of landmarks includes training an artificial intelligence (AI) system to detect inaccurate registration of landmarks. Training the AI system uses training data that includes scans of an environment captured by a 3D measuring device from corresponding scan points. A first scan is registered with at least a second scan based on one or more landmarks captured in the first scan and the second scan. Further, a model is created to identify incorrect registration by analyzing the training data. The analysis detects a mismatch in a first instance of a landmark in the first scan and a second instance of said landmark in the second scan. The model is then used to evaluate registration of landmarks in live data, the live data including a set of scans, the result identifying accuracy level of the registration of landmarks.

20 Claims, 10 Drawing Sheets

(56) References Cited

U.S. PATENT DOCUMENTS

2020/0394815 A1 12/2020 Wohlfeld et al.
2020/0410064 A1 12/2020 Bauer et al.

OTHER PUBLICATIONS

Hwang, Donghwi, et al. "Generation of PET attenuation map for whole-body time-of-flight 18F-FDG Pet/Mri using a deep neural network trained with simultaneously reconstructed activity and attenuation maps." Journal of Nuclear Medicine 60.8 (2019): 1183-1189. (Year: 2019).*
European Search Report; dated Oct. 20, 2021; Application No. 21174176.4; Filed: May 17, 2021; 11 pages.

* cited by examiner

ARTIFICIAL INTELLIGENCE BASED REGISTRATION SUPPORT FOR ENVIRONMENTAL SCANS

CROSS REFERENCE TO RELATED APPLICATIONS

This application claims the benefit of U.S. Provisional Application Ser. No. 63/028,162, filed May 21, 2020, the entire disclosure of which is incorporated herein by reference.

BACKGROUND

Embodiments of the present invention generally relate to computing technology, and particularly to registering several scans, which are captured by a three-dimensional measurement device such as a laser scanner, to map an environment using artificial intelligence.

The subject matter disclosed herein relates to the use of a three-dimensional ("3D") measurement device, such as a laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A time-of-flight (TOF) laser scanner is a scanner in which the distance to a target point is determined based on the speed of light in air between the scanner and a target point. Laser scanners are typically used for scanning closed or open spaces such as interior areas of buildings, industrial installations, and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., azimuth and a zenith angle), and optionally a gray-scale value. This raw scan data is collected, stored, and sent to a processor or processors to generate a 3D image representing the scanned area or object.

Generating an image requires at least three values for each data point. These three values may include the distance and two angles or may be transformed values, such as the x, y, z coordinates.

Most TOF scanners direct the beam of light within the measurement volume by steering the light with a beam steering mechanism. The beam steering mechanism includes a first motor that steers the beam of light about a first axis by a first angle that is measured by a first angular encoder (or another angle transducer). The beam steering mechanism also includes a second motor that steers the beam of light about a second axis by a second angle that is measured by a second angular encoder (or another angle transducer). As a result of the scan, a collection of 3D coordinates is generated for points on surfaces in the environment. This collection of 3D coordinates is sometimes referred to as a "point cloud." In many applications, multiple scans may be performed in an environment to acquire the desired measurements.

Many contemporary laser scanners include a camera mounted on the laser scanner for gathering digital images of the environment and for presenting the digital images to an operator of the laser scanner. By viewing the camera images, the operator of the scanner can determine the field of view of the measured volume and adjust settings on the laser scanner to measure over a larger or smaller region of space. In addition, the digital images may be transmitted to a processor to add color to the scanner image. At least three positional coordinates (such as x, y, z) and three color values (such as red, green, blue "RGB") are collected for each data point to generate a color scanner image.

Accordingly, while existing 3D scanners are suitable for their intended purposes, what is needed is a 3D scanner having certain features of embodiments of the present invention.

BRIEF DESCRIPTION

According to one or more embodiments, a system includes a 3D measuring device, and one or more processors operably coupled to the 3D measuring device. The one or more processors are operable to train an artificial intelligence system to detect accuracy of registration of landmarks. The training includes receiving training data that comprises a plurality of scans of an environment captured by the 3D measuring device, each scan is captured from a corresponding scan point, and wherein, a first scan is registered with at least a second scan based on one or more landmarks captured in the first scan and the second scan. The training further includes creating a model to identify incorrect registration by analyzing the training data, the training comprising detecting a mismatch in a first instance of a landmark in the first scan and a second instance of said landmark in the second scan. The training further includes evaluating registration of landmarks in live data received from the 3D measuring device based on the model trained by the artificial intelligence system, the live data including a set of scans. The training further includes outputting a result of the evaluation of the registration of landmarks, the result identifying accuracy level of the registration of landmarks.

In one or more embodiments, the 3D measuring device further includes a light source and a camera. In one or more embodiments, the training to identify the accuracy of registration is supervised training.

In one or more embodiments, evaluating the registration of a landmark in the live data comprises classifying a registration of a landmark as one of accurate, inaccurate, and may be inaccurate. In one or more embodiments, the result of the evaluation comprises a flag that is placed at the position of said landmark in the scan that is displayed. In one or more embodiments, one or more visual attributes of the flag are based on the classification of the registration of said landmark.

In one or more embodiments, the one or more processors are integral with the 3D measuring device.

According to one or more embodiments, a method for automatically determining quality of registration of landmarks includes training an artificial intelligence (AI) system to detect inaccurate registration of landmarks. Training the AI system uses training data that includes scans of an environment captured by a 3D measuring device from corresponding scan points. A first scan is registered with at least a second scan based on one or more landmarks captured in the first scan and the second scan. Further, a model is created to identify incorrect registration by analyzing the training data. The analysis detects a mismatch in a first instance of a landmark in the first scan and a second instance of said landmark in the second scan. The model is then used to evaluate registration of landmarks in live data, the live data including a set of scans, the result identifying accuracy level of the registration of landmarks.

Other embodiments are described in which a non-transitory computer-readable medium having program instructions embodied therewith cause a processor to perform a method for automatically determining quality of registration of landmarks.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example, with reference to the drawings.

DETAILED DESCRIPTION

The present disclosure relates to a system having a three-dimensional ("3D") measuring device and one or more processors. Embodiments of the invention provide advantages in generating a model or point cloud of an environment using the 3D measuring device, such as a laser scanner. Generating the model includes registering several scans that are captured by the 3D measuring device. In existing systems, registration of multiple scans without artificial targets is based on mathematical optimization technologies like top-view or cloud to cloud registration techniques. Typically, the result is a registered project that has an overall "fitting number" like 6.5 mm accuracy over 50 scans, although several scans can still be off by 10 cm to 100 cm in some locations. This means that the project is not yet registered correctly, while the fitting algorithm states it is registered correctly since the average accuracy is within a predetermined threshold. This leads to less trust and even wrong projects with incorrect registration of one or more individual scans, although an overall accuracy (e.g., average accuracy) can satisfy a predetermined threshold. Embodiments of the present disclosure facilitate an artificial intelligence (AI) system to be trained using supervised learning to identify that registration is not accurate even if an overall accuracy threshold is satisfied. Further, in one or more embodiments of the present disclosure, the AI system can modify the registration of one or more scans to improve the registration-accuracy of those scans.

Figure 1:
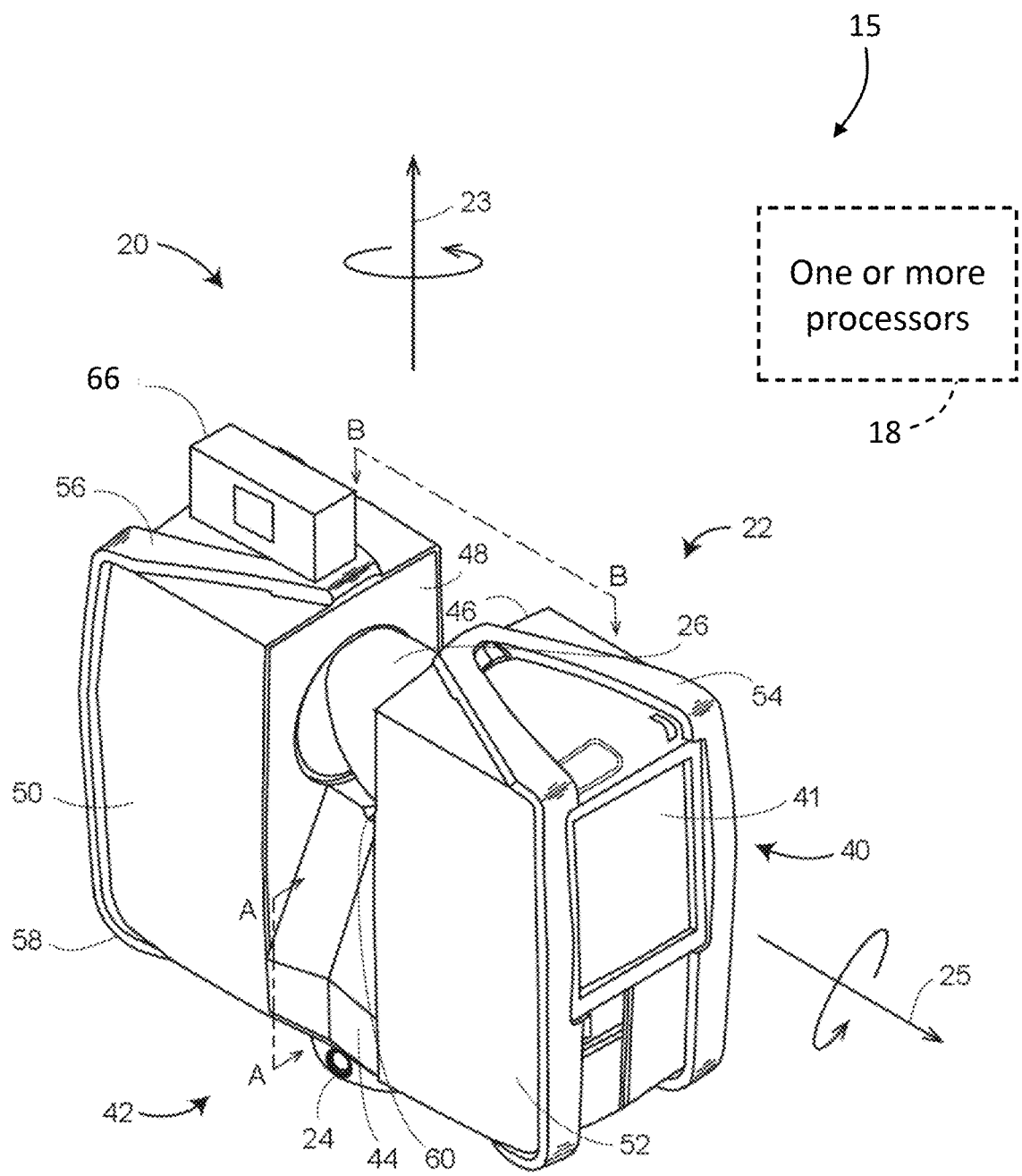
FIG. 1 is a perspective view of a laser scanner in accordance with an embodiment of the invention.
Figure 2:
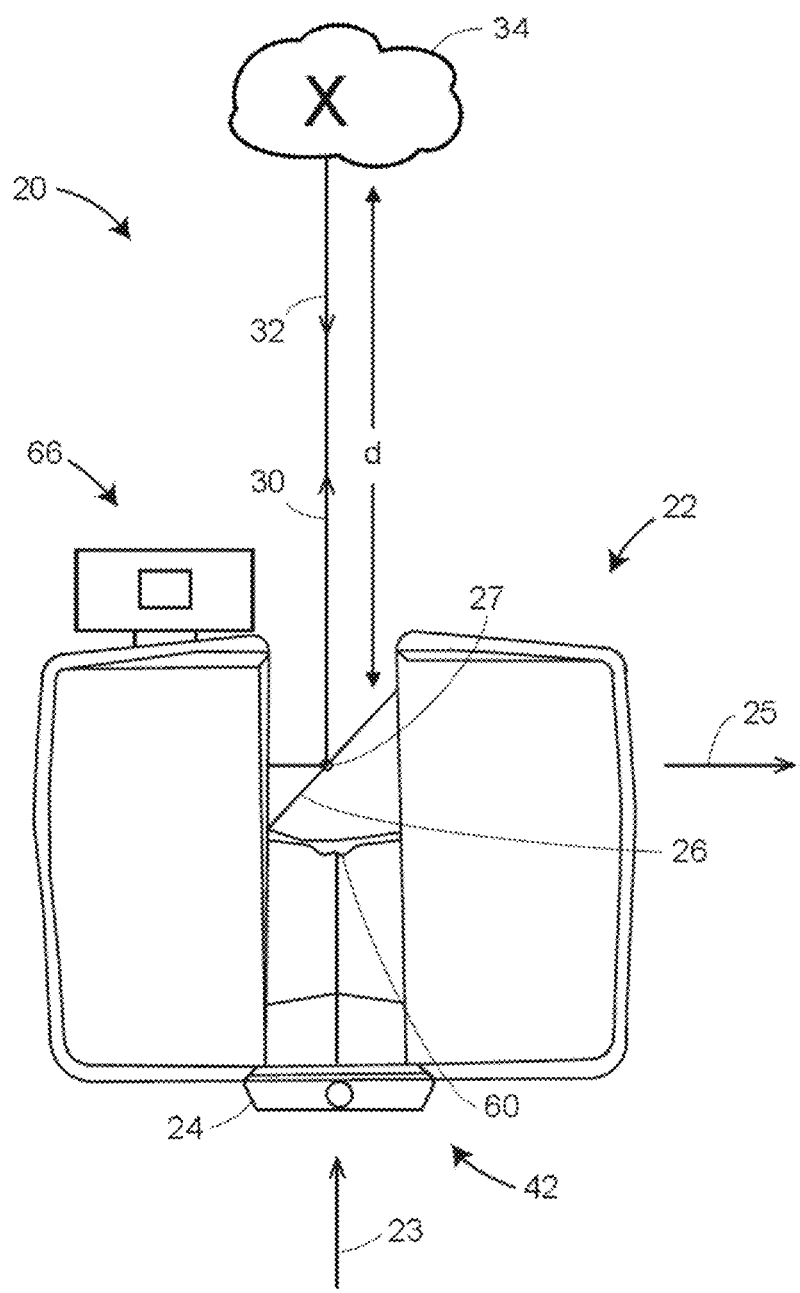
FIG. 2 is a side view of the laser scanner illustrating a method of measurement according to an embodiment.
Figure 3:
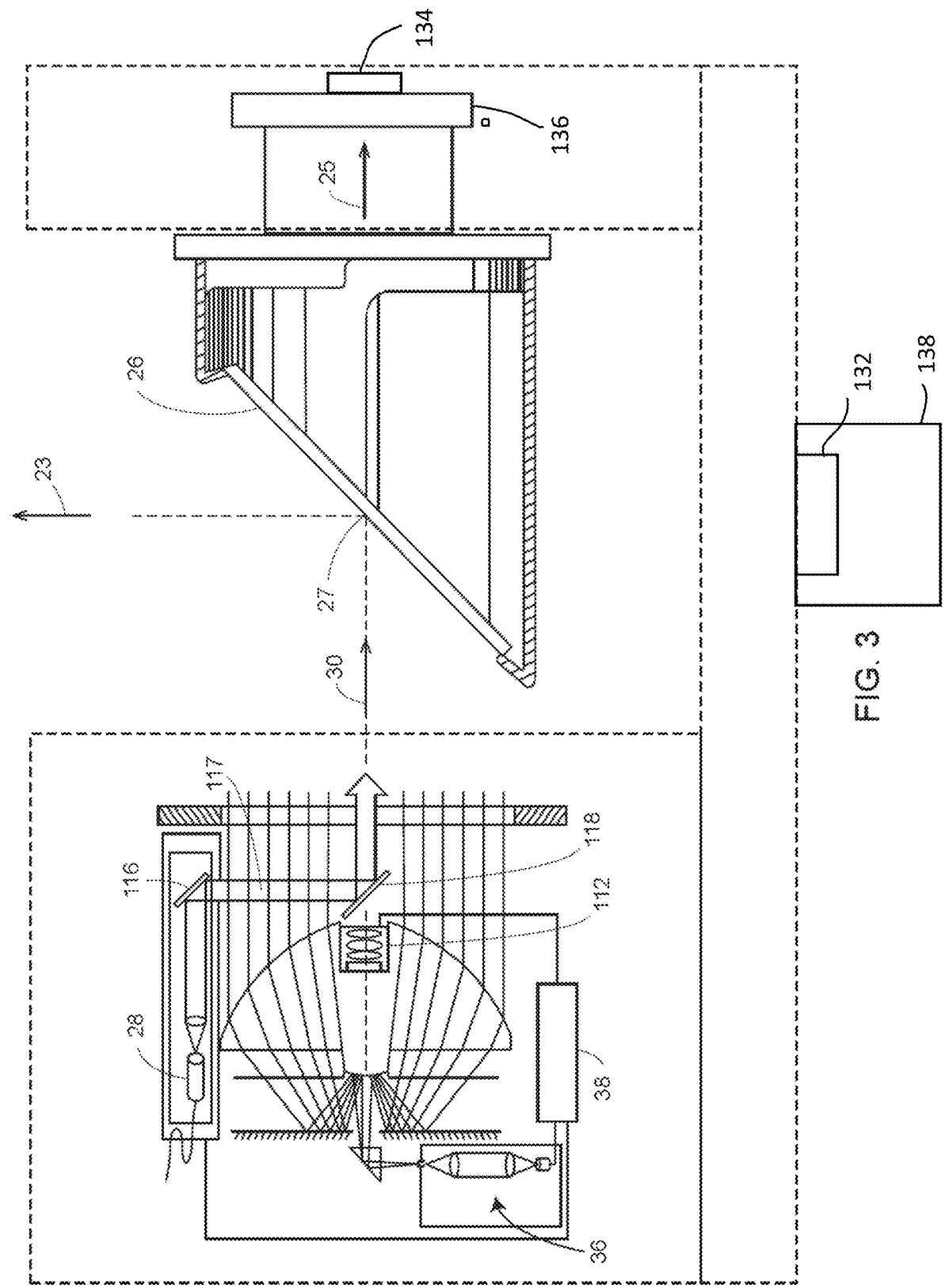
FIG. 3 is a schematic illustration of the optical, mechanical, and electrical components of the laser scanner according to an embodiment.

Referring now to FIGS. 1-3, a system 15 having a laser scanner 20 is shown for optically scanning and measuring the environment surrounding the laser scanner 20. In an embodiment, the system 15 may include one or more processors 18 that are coupled for communication to the laser scanner 20. The communication can be wired or wireless. In one or more embodiments of the present disclosure, the one or more processors 18 are integral with the laser scanner 20. As will be described in more detail herein, the one or more processors 18 are configured to identify patterns in 3D coordinated data that correspond with known or predetermined shapes and automatically adjust the registration of scan datasets having 3D coordinate points associated with the identified patterns to generate a second or clean 3D coordinate data.

The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to the vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example, 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity-modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions, in turn, depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment, the phase shift of modulation in light emitted by the laser scanner 20 and the point X is determined and evaluated to obtain a measured distance d.

The speed of light in air depends on the properties of the air, such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}$=c/n. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel in a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by the integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the graphical touch screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48, and cover the components of the laser scanner 20. In the exemplary embodiment, the shells 50, 52 are made from plastic material, such as polycarbonate or polyethylene, for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum, for example, that assists in protecting the shells 50, 52 during transport and operation. The yokes 54, 56, each includes an arm portion 58 that is coupled, such as with a fastener, for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 44, the walls 46, 48, and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52, and the measuring head 22 from damage during transportation and operation. In other embodiments, the yokes 54, 56 may include additional features, such as handles to facilitate the carrying of the laser scanner 20 or attachment points for accessories, for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation, mirror 26 directs the emitted light beam 30 onto the traverse 44 and the prism 60. Due to non-linearities in the electronic components, for example, in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point, and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, a first image acquisition device, such as digital camera 112, is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136, and the angular/rotational position of the mirror is measured by angular encoder 134. The dichroic beam-splitter 118 allows light to pass through at wavelengths different from the wavelength of light 117. For example, the light emitter 28 may be a near-infrared laser light (for example, the light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
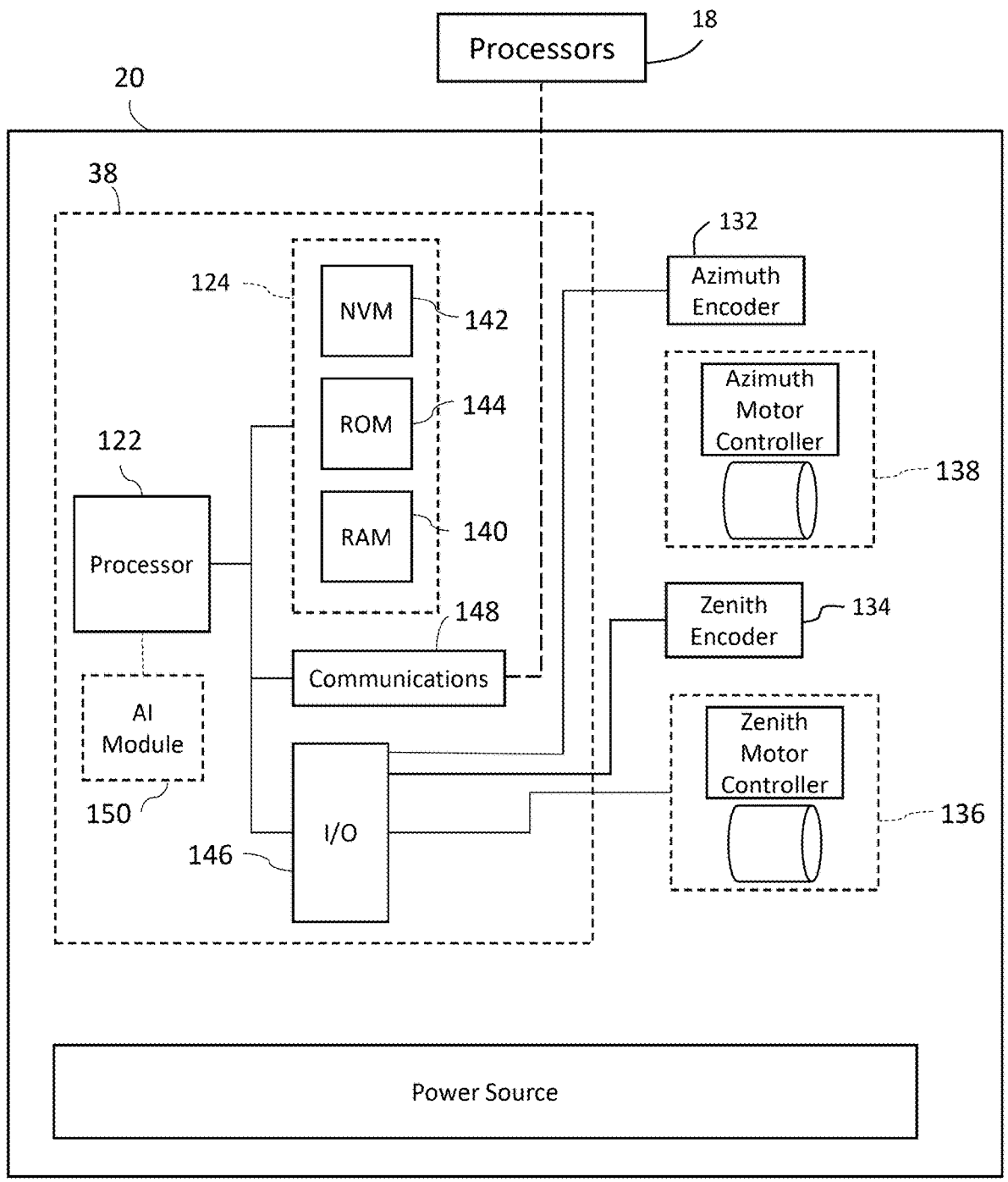
FIG. 4 illustrates a schematic illustration of the laser scanner of FIG. 1 according to an embodiment.

Referring now to FIG. 4 with continuing reference to FIGS. 1-3, elements are shown of the laser scanner 20. Scanner controller 38 is a suitable electronic device capable of accepting data and instructions, executing the instructions to process the data, and presenting the results. The scanner controller 38 includes one or more processing elements 122. The processors may be microprocessors, field programmable gate arrays (FPGAs), digital signal processors (DSPs), and generally any device capable of performing computing functions. The one or more processor elements 122 have access to memory 124 for storing information. In an embodiment, the one or more processors 18 may be integral with the processor elements 122. In an embodiment, the scanner controller 38 may also include artificial intelligence (AI) module 150 that is implemented by an AI system 525 described herein.

Scanner controller 38 is capable of converting the analog voltage or current level provided by light receiver 36 into a digital signal to determine a distance from the laser scanner 20 to an object in the environment. Scanner controller 38 uses the digital signals that act as input to various processes for controlling the laser scanner 20. The digital signals represent one or more laser scanner 20 data including but not limited to the distance to an object, images of the environment, images acquired by panoramic camera 126, angular/rotational measurements by a first or azimuth encoder 132, and angular/rotational measurements by a second axis or zenith encoder 134.

In general, scanner controller 38 accepts data from encoders 132, 134, light receiver 36, light emitter 28, and panoramic camera 126 and is given certain instructions for the purpose of generating a 3D point cloud of a scanned environment. Scanner controller 38 provides operating signals to the light emitter 28, light receiver 36, panoramic camera 126, zenith motor 136, and azimuth motor 138. The scanner controller 38 compares the operational parameters to predetermined variances, and if the predetermined variance is exceeded, generates a signal that alerts an operator to a condition. The data received by the scanner controller 38 may be displayed on a user interface or display device 40 coupled to scanner controller 38. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to scanner controller 38. In one embodiment, the user interface is arranged or executed on a mobile computing device that is coupled for communication, such as via a wired or wireless communications medium (e.g., Ethernet, serial, USB, Bluetooth™ or WiFi) for example, to the laser scanner 20.

The scanner controller 38 may also be coupled to external computer networks such as a local area network (LAN) and the Internet. A LAN interconnects one or more remote computers, including one or more processors 18, which are configured to communicate with scanner controller 38 using a well-known computer communications protocol such as TCP/IP (Transmission Control Protocol/Internet(˘) Protocol), RS-232, ModBus, and the like. Additional scanners 20 may also be connected to LAN with the scanner controllers 38 in each of these scanners 20 being configured to send and receive data to and from remote computers and other scanners 20. The LAN may be connected to the Internet. This connection allows scanner controller 38 to communicate with one or more remote computers connected to the Internet.

The processor elements 122 are coupled to memory 124. The memory 124 may include random access memory (RAM) device 140, a non-volatile memory (NVM) device 142, and a read-only memory (ROM) device 144. In addition, the processor elements 122 may be connected to one or more input/output (I/O) controllers 146 and a communications circuit 148. In an embodiment, the communications circuit 92 provides an interface that allows wireless or wired communication with one or more external devices or networks, such as the LAN discussed above, or to the one or more processors 18.

Scanner controller 38 includes operation control methods embodied in application code. These methods are embodied in computer instructions written to be executed by processor elements 122, typically in the form of software. The software can be encoded in any language, including, but not limited to, assembly language, VHDL (Verilog Hardware Description Language), VHSIC HDL (Very High-Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby, and any combination or derivative of at least one of the foregoing.

The laser scanner 20 is moved from one scan point to another in the environment that is being mapped. The several scans captured in this manner have to be registered with each other to generate a model or point cloud of the environment. In existing systems, the widely used registration algorithms are implemented as mathematical optimizations trying to minimize a predetermined set of functions associated with one or more parameters. For example, such functions describe a distance between two or more sets of points. Here, the assumption of the existing registration algorithms is that minimizing such distance performs a good or desired registration. However, such an assumption can be wrong as it does not consider how real-world objects look and therefore is not selective in weighting "differences" in the captured scans. Accordingly, one or more embodiments of the present disclosure include an AI system that is trained by humans to identify whether the registration is accurately performed. This is because humans have an understanding of the shape (e.g. circles or squares) or geometrical features (e.g. square corners) of real-world objects and, therefore, can train the AI system to identify registration errors. Over time, the AI system learns how good/desired registrations and how bad/undesired registrations look, for example, from the top or side view and eventually can detect faulty registrations autonomously, once training is complete.

Figure 5A:
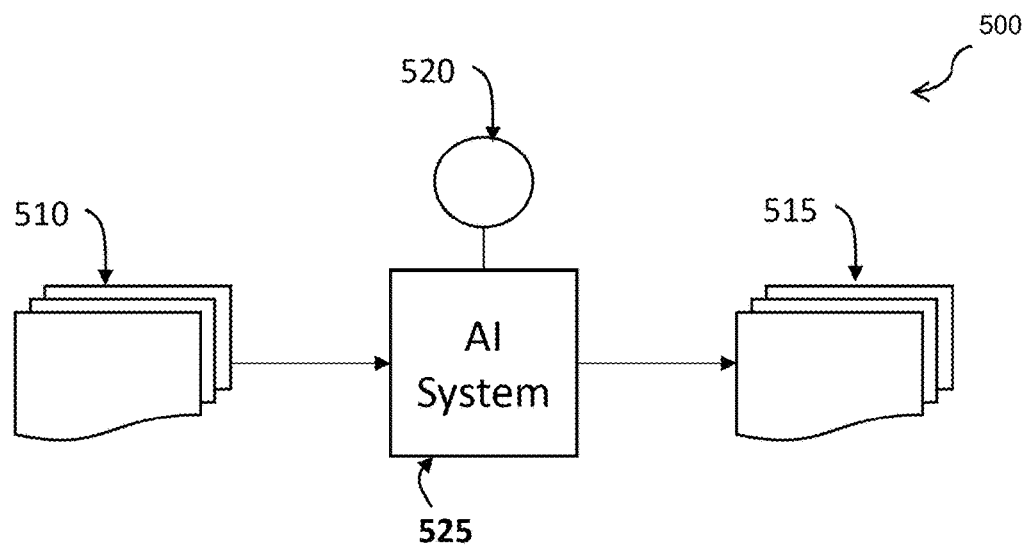
FIG. 5A illustrates a system for artificial intelligence-based registration support for environmental scans according to one or more embodiments of the present invention.

FIG. 5A depicts a block diagram of a system for providing registration support for scans captured by a measurement device according to one or more embodiments of the present invention. The system 500 includes a human operator 520 that trains the AI system 525. The training includes receiving multiple instances of registered scans 510. During a training phase, the operator 520 indicates to the AI system 525 whether the input scans 510 are correctly registered or not. The operator 520 further indicates why the registration is incorrect (or correct). In one or more embodiments of the present invention, such reasoning can be provided by changing the registration of the input scans 510 to generate a set of output scans 515, the output scans being correctly registered according to the operator 520.

Figure 5B:
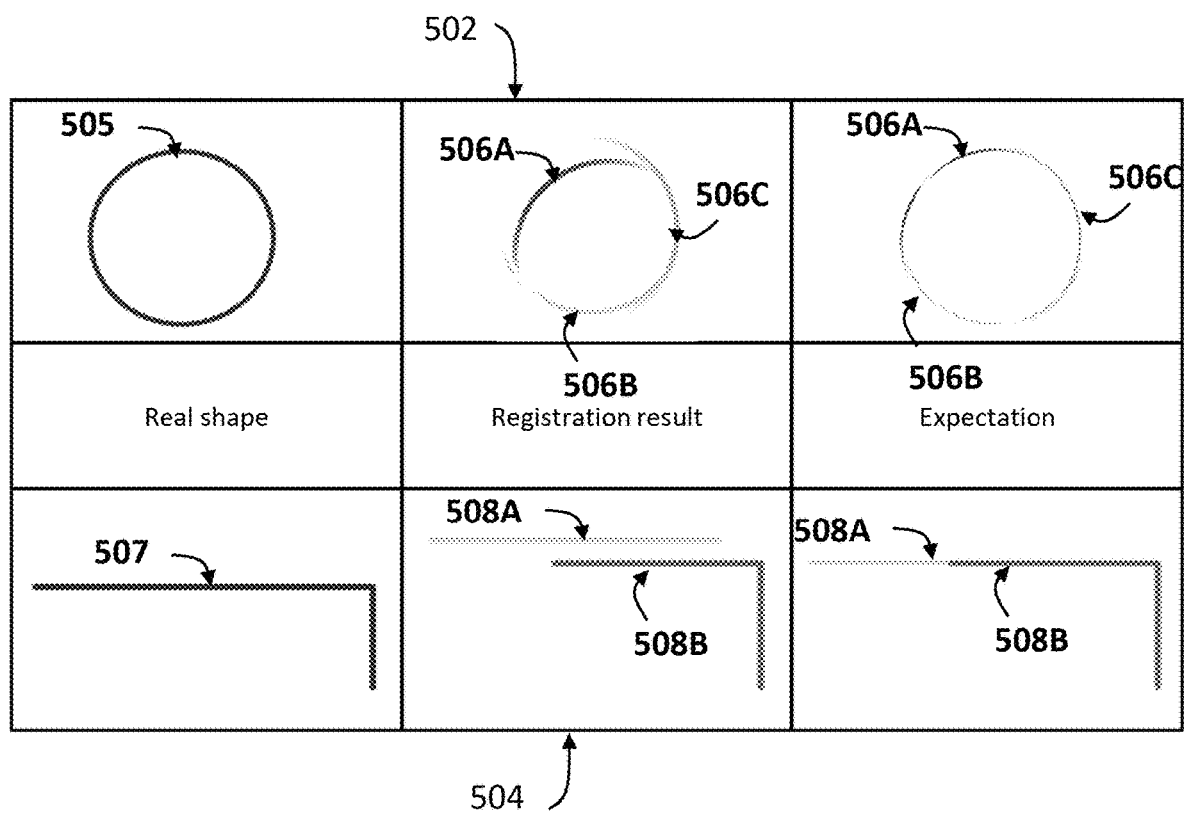
FIG. 5B illustrates example scenarios of registrations of landmarks.

FIG. 5B depicts examples of incorrect and correct registrations according to one or more embodiments of the present disclosure. In a first example, consider that a circular shape 505 is being scanned. The scanner 20 captures three separate scan datasets, scan 506A, 506B, and 506C, which are provided to the AI system 525 as the input scans 510 (FIG. 5A). The input scans 510 are registered incorrectly, as shown. The correct registration is also shown as an expectation that the AI system 525 can generate as the output scans 515.

Similarly, in another example, an L-shaped object 507, such as the inside corner of a room, is being scanned. Here, the scanner 20 captures two scans 508A and 508B. The input scans 510 are incorrectly registered when they are input to the AI system 525. The operator 520 adjusts the registration of the input scans 510 to provide the output scans 515 with the expected registration. The adjustment of the registration of the scan inputs may include shifting the position of one or more of the scan datasets.

Figure 6:
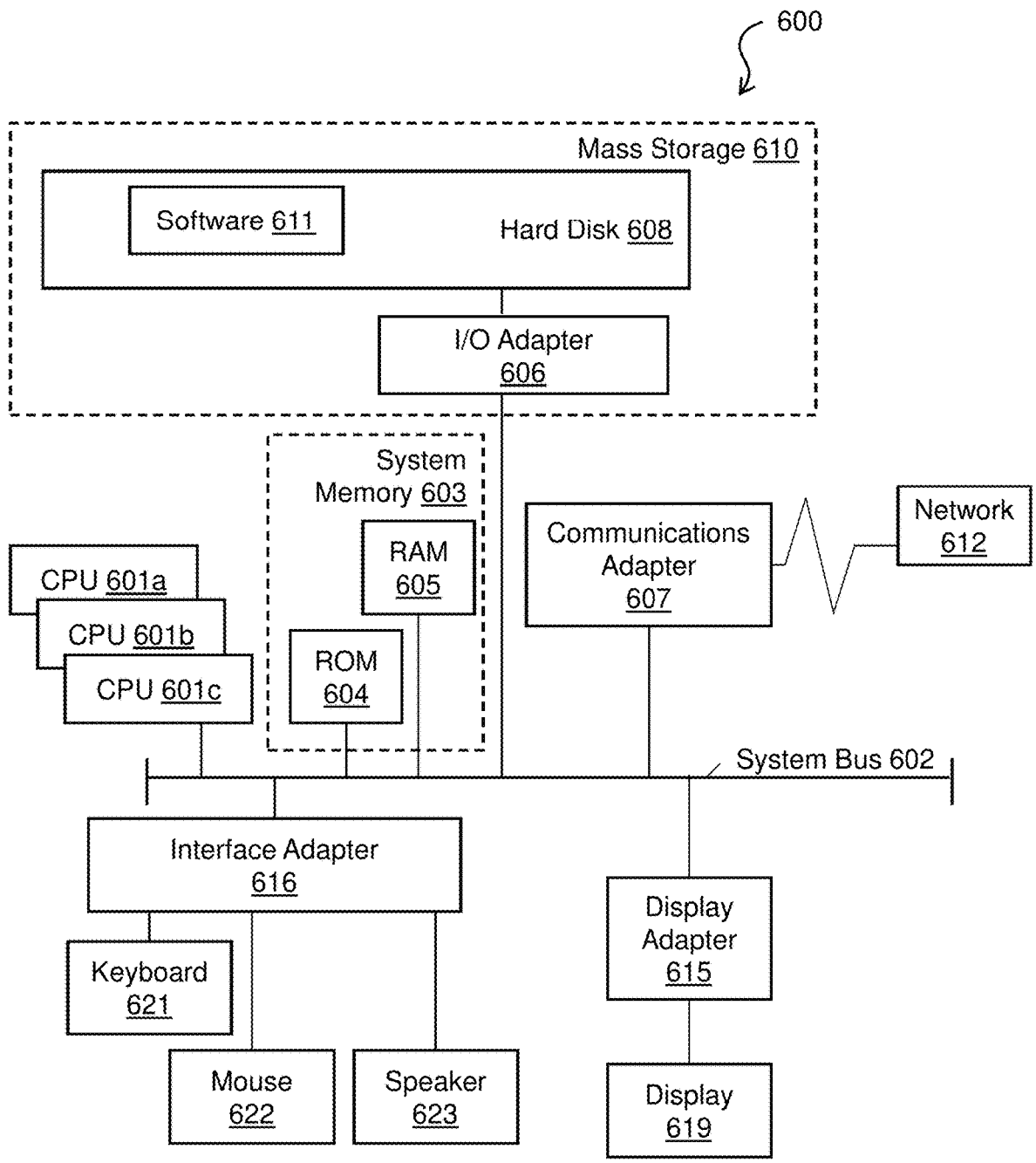
FIG. 6 illustrates a computing system according to one or more embodiments of the present invention.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described hereinbelow with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics-intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external web server or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

Figure 7:
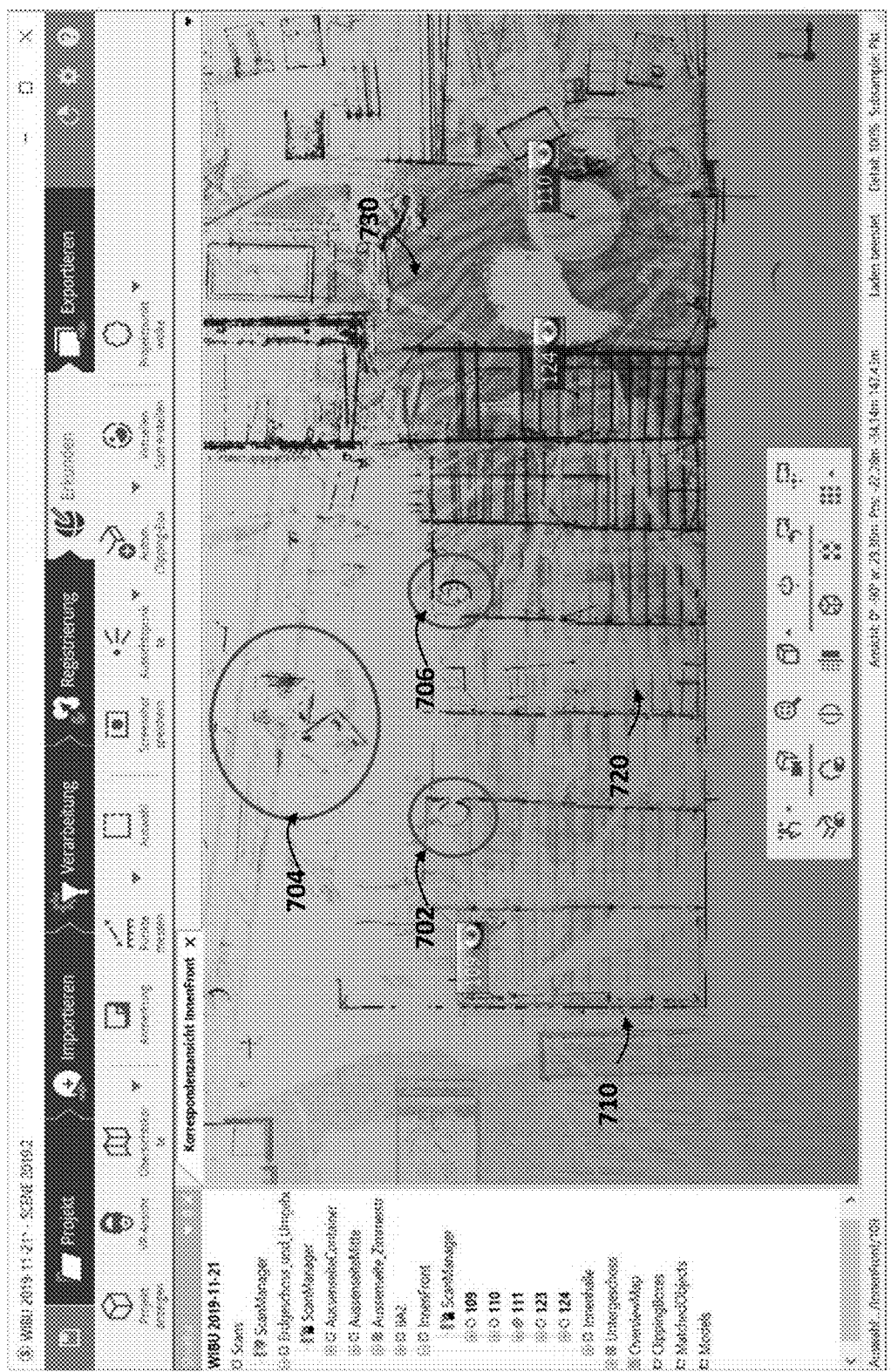
FIG. 7 illustrates examples of inaccurate registration of landmarks according to one or more embodiments of the present invention.
Figure 8:
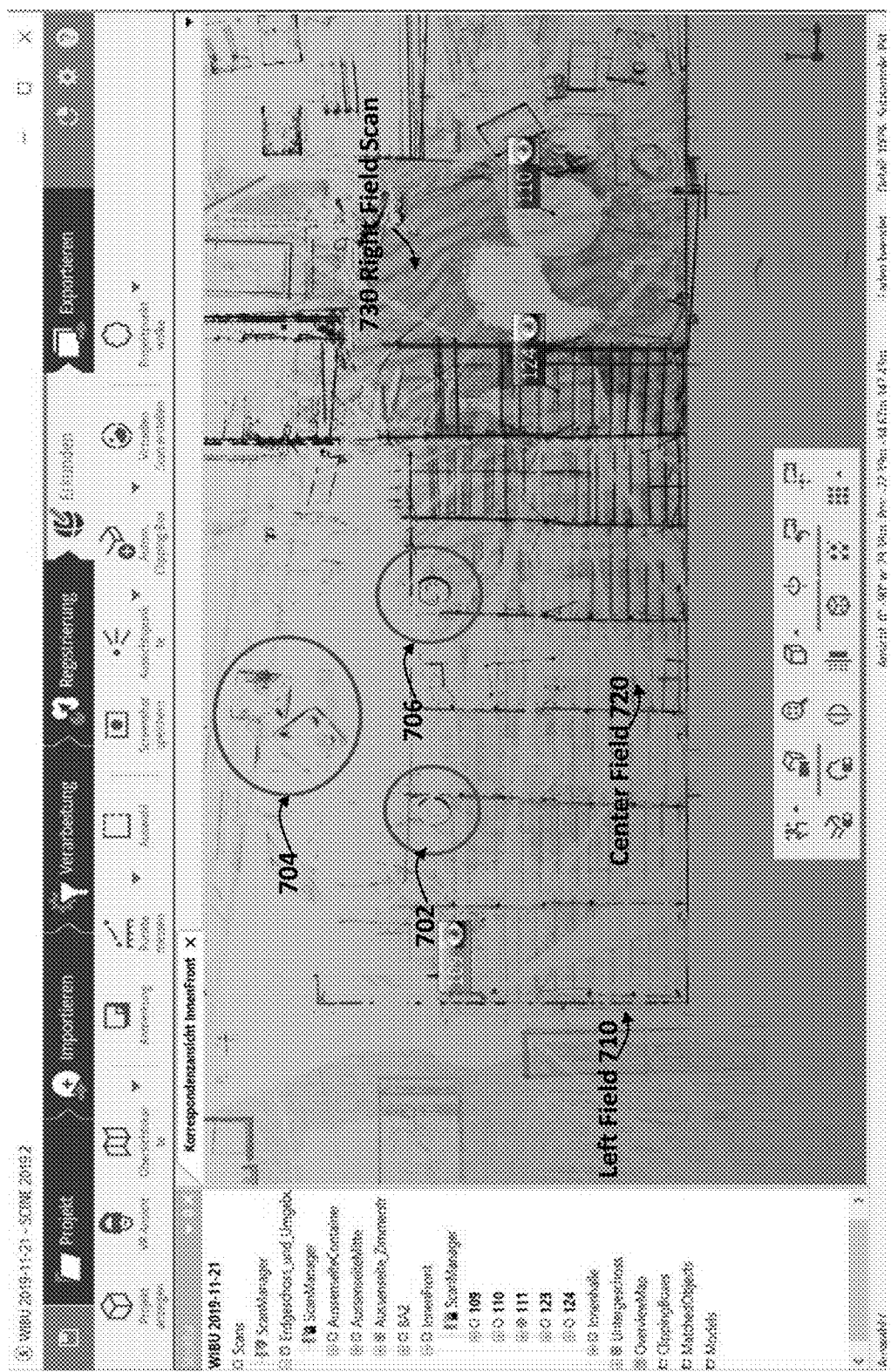
FIG. 8 illustrates example correction of registration of landmarks according to one or more embodiments of the present invention.
Figure 9:
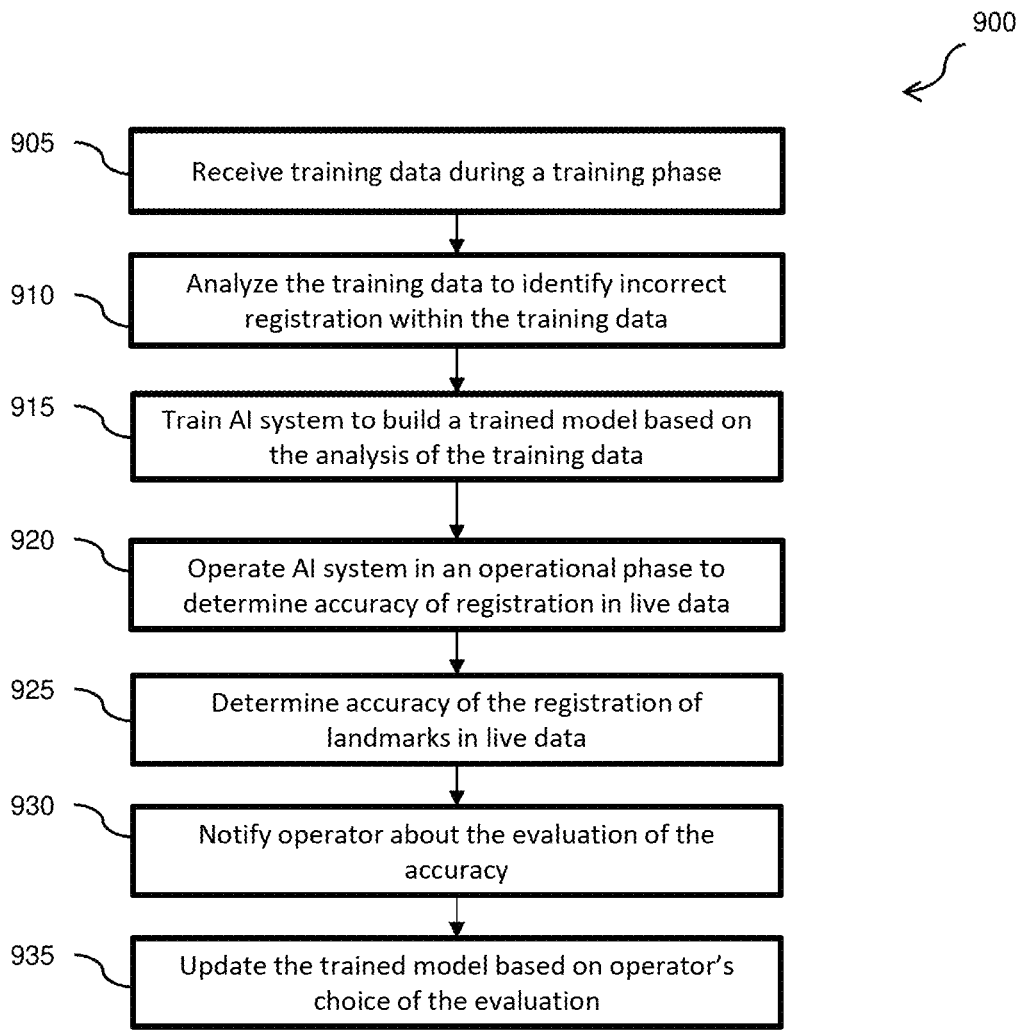
FIG. 9 depicts a flow diagram of a method for automatically determining the quality of registration of landmarks according to one or more embodiments.

FIG. 7 and FIG. 8 depict an example training phase of an AI system for supporting the registration of multiple scans according to one or more embodiments of the present disclosure. FIG. 9 depicts a flowchart of a method for training the AI system for supporting the registration of multiple scans according to one or more embodiments of the present disclosure. The operations in the flowchart are described herein using the examples in FIG. 7 and FIG. 8. The method 900 includes receiving, by the AI system 525, training data for teaching the AI system 525 correctness of registration, at block 905. The training data includes the input scans 510 that have been registered algorithmically. For example, the input scans 510 may be registered using cloud-to-cloud or any other existing algorithms. For example, FIG. 7 depicts three scans of an environment, a left-field scan 710 (shown in yellow; first scan), a center-field scan 720 (shown in blue; second scan), and a right-field scan 730 (shown in red/maroon; third scan). The three scans are registered, i.e., aligned by performing one or more of the operations of rotation, translation, scaling, skewing, etc. it should be noted that the scans depicted herein are top views of the point cloud representing the scanned environment. However, in other operations, the point cloud can be viewed as side views or any other types of views that can be used in a registration process to generate a model or point cloud of the environment being scanned.

The method 900 of training the AI system 525 further includes identifying, by the operator 520, one or more landmarks where the registration does not appear accurate, at block 910. In the depicted example in FIG. 7, the operator 520 identifies inaccurate registrations 702, 704, and 706. It is understood that there can be a different number of inaccurately registered landmarks in other examples.

Here, a first inaccurate registration 702 and a second inaccurate registration 706 have circular shapes (see FIG. 5B) that are inaccurately registered. A third inaccurate registration 704 has an L-shape landmark (e.g. an inside corner formed by the intersection of two walls) that is inaccurately registered.

The landmarks with the circular shapes can be columns, pipes, or any other circular-shaped artifacts in the environment. The L-shaped landmarks can be wall-corners, staircases, or any other angular artifacts in the environment. The landmarks can be structural elements of the environment, for example, columns, beams, or other elements that are part of the structure itself. Alternatively, or in addition, the landmarks can include elements such as vases, plants, furniture, décor-items, fire extinguishers, tanks, process equipment, and the like that are not integral part of the structure, however, are items that are not relocated frequently.

The operator 520 identifies such inaccurately registered landmarks in the input scans 510 based on a visual inspection of the initial or proposed registration. The AI system 525 is trained to recognize the pattern of the inaccurately registered landmarks by such supervised training. It should be noted that operator 520 can mark the inaccurately registered landmarks in the input scans 510 prior to the input scans 510 being input to the AI system 525 as training data. The training data further includes the correct registration in these cases, i.e., the expected registration (see FIG. 5B for examples). The AI system 525 generates a model that can determine the accuracy of a landmark registration based on the training, at block 915.

Figure 10:
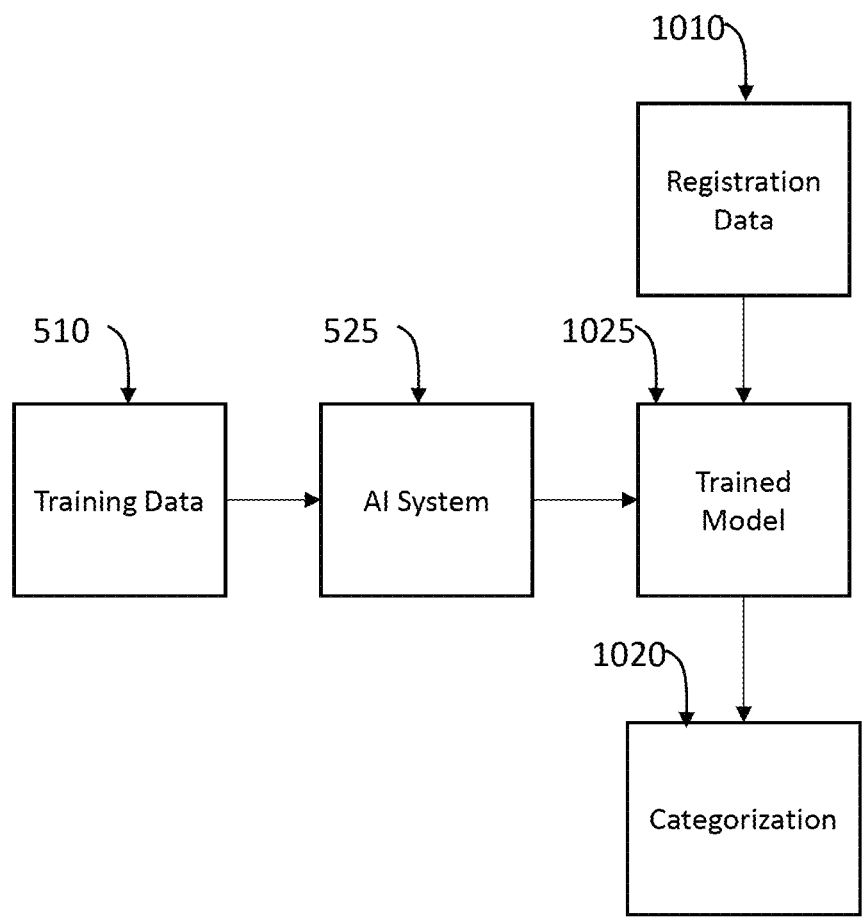
FIG. 10 depicts a block diagram of training a model by the artificial system and using the model to categorize registration of landmarks in live data according to one or more embodiments of the present invention.

FIG. 10 depicts an example block diagram of the supervised training of the AI system according to one or more embodiments of the present invention. The AI system 525 creates the trained model 1025 based on the training data 510 from the operator 520. Once trained, the trained model 1025 can be used to provide categorization 1020 of the registration data 1010 in new scans that are input to the AI system 525. The registration data 1010 is categorized according to the perceived accuracy of the registration by the trained model 1025. The new scans are not labeled by the operator 520, and in one or more embodiments of the present invention, not even seen by the operator 520 prior to being input to the AI system 525.

In one or more embodiments of the present disclosure, the trained model 1025 can be created using a classification model that provides the categorization 1020 as "Accurate registration" or "Inaccurate registration," or "Pass" or "Fail." Classification Models are used to predict the category of the registration data 1010. Alternatively, the trained model 1025 is a regression model that is used to determine the categorization 1020 as a real value, such as a fitting value by which the registration is not accurate, for example. The regression model can be linear regression, logistic regression, polynomial regression, ridge regression, or any other such regression model.

In one or more embodiments of the present disclosure, training the AI system 525 includes an image classification, where the objective is to classify the input scans 510, including specific patterns that represent the inaccurate registration of landmarks such as the examples in FIG. 5B. The AI system 525, in one or more embodiments of the present disclosure, uses a convolutional neural network (CNN) that is used to progressively extract higher- and higher-level representations of the image content from the input scans 510. Instead of preprocessing the data to derive features like textures and shapes, the CNN learns how to extract these features, and ultimately infer whether they constitute an inaccurate registration of landmark(s). The CNNs can use a Rectified Linear Unit (ReLU) transformation to introduce nonlinearity in the trained model 1025.

It should be noted that other supervised machine learning techniques can be used to build the trained model 1025 apart from the techniques described herein.

FIG. 8 depicts the corresponding correct registrations of landmarks 702, 704, and 706. In one or more embodiments of the present disclosure, the correct registration is also part of the training data. The AI system 525 uses the difference between the inaccurate registrations and the corresponding accurate registrations to train the model 1025 to determine the severity of the inaccuracy in registration. Further, in one or more embodiments of the present disclosure, the AI system 525 trains the trained model 1025 to adjust the inaccurate registration of one or more landmarks in the input live data 1010. For example, in an embodiment, the AI system 525 traces the erroneous data points to the scanner 20 that was used to measure the data points. The human operator 520 can train the AI system 525 by providing adjustments to the positions or pose (six degree of freedom) of the scanner 20 to improve the accuracy of the registration. FIG. 8 depicts such an example scenario where the pose was revised to improve the accuracy of the registration. In the depicted example, the scan data for the left-field scan 710 is moved to the left (~0.5 m), when viewed from the top view shown, and a down (~0.1 m), when viewed from a side view (not shown), to correct the registration errors so that the landmarks have the correct shape. It is understood that the correction can be different in other scenarios and the individual scan datasets may be moved in two or three dimensions to achieve a registration where the landmarks have the correct/desired shape.

Once the model 1025 is trained, the method 900 further includes operating the AI system 525 in an operational phase to determine the accuracy of registration in live data, at block 920. In the operational phase, the AI system 525 receives live registration data 1010 from the scanner 20. The live registration data 1010 does not include any labels that identify inaccurate registrations. Further, in the case of the live data, the operator 520 can be seeking assistance with verifying that the registration has been done accurately (i.e. the landmarks have the desired shape). As noted earlier, although the overall or average registration accuracy may satisfy a predetermined accuracy threshold, parts of the model or point cloud of the environment can still be offset, i.e., inaccurately registered.

Accordingly, the AI system 525, by using the trained model 1025, can determine the accuracy of the registration of landmarks in the live data 1010, at block 925. The accuracy is determined as the classification output/categorization 1020 of the trained model. The AI system 525 supports the operator 520, from an inexperienced user to an experienced user, during the registration step, which can be complicated by the size of the environment being scanned, or the density of landmarks in the environment, or any other such factors. The AI system 525 checks the registered data 1020 and creates an evaluation of the accuracy of the registration, at block 930. The evaluation is a seal of quality of the registration. In one or more embodiments of the present disclosure, the AI system creates one of three levels of notification for the operator. For example, if the registration is good, i.e., the determined accuracy by the trained model is above a predetermined threshold, the AI system 525 provides the operator with a passing notification. For example, a specific colored notification, such as green color, specific icon, or any other notification that represents that the registration is verified as accurate.

Alternatively, if the registration is inaccurate (e.g. one or more landmarks may have an inaccurate shape), the AI system 525 provides a notification that indicates a failure such as a red-colored notification, a specific icon, or any other such failure notification. In another alternative case, if a confidence level in the determined accuracy does not exceed a predetermined threshold, the AI system 525 provides a 'may be' notification. For example, the may be notification can be represented by a specific colored notification, such as yellow, or a specific icon, or any other such representation.

Furthermore, the AI system 525 creates flags in the user interface that identify portions in the map where the AI system 525 has identified that the registration is not accurate (e.g., areas 702, 704, 706 as shown in FIG. 7). The flags can be visual notifications of the specific portions in the map, such as circles, icons, or any other user interface indication. The operator 520 can switch through these flags and decide if the warning of the AI system 525 is reasonable or unreasonable. In one or more embodiments of the present disclosure, one or more visual attributes of the flag are based on the classification of the registration of said landmark as accurate, inaccurate, or may be inaccurate (accurate). The visual attributes include color, size, icon, image, or any other such attribute used to render the flag on the visual depiction of the scan.

Further, the input from the operator 520 is not only used to improve the registration but also to train the AI system 525 further with the new registration data. The updates from the operator 520 are input as additional training data into the AI system 525, which tweaks the trained model 1025 further based on such training data.

The one or more embodiments of the present disclosure can accordingly support the operator 520 to create improved results with the generated model or point cloud of the environment.

It should be appreciated that while embodiments herein describe supporting the registration of landmarks in a 3D point cloud generated by a phase-shift TOF laser scanner, this is, for example, purposes and the claims should not be so limited. In other embodiments, the 3D coordinate data or point cloud may be generated by any type of 3D measurement device, such as but not limited to a pulsed TOF laser scanner, frequency modulated continuous wave (FMCW) scanner, triangulation scanner, an area scanner, a structured light scanner, a laser line probe, a laser tracker, or a combination of the foregoing. Further, it should be appreciated that the examples described herein show top views of scan data; however, elevation or side views can also be used for registration, and such registration can also be improved as described herein.

It should be appreciated that while 3D coordinate data may be used for training, the methods described herein for verifying the registration of landmarks may be used with either two-dimensional or three-dimensional data sets.

Technical effects and benefits of the disclosed embodiments include, but are not limited to, increasing scan quality and a visual appearance of scans acquired by the 3D coordinate measurement device.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer-readable medium(s) having computer-readable program code embodied thereon.

One or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer-readable storage medium may be a tangible medium containing or storing a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

The computer-readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:
a three-dimensional (3D) measuring device having a display;
an artificial intelligence (AI) system that determines an accuracy of registrations of landmarks and scan points captured by the 3D measuring device; and
at least one processor coupled to the 3D measuring device and the AI system, the at least one processor executing the following program instructions, including:
when in a training phase, receiving training data that comprises a plurality of scans of an environment captured by the 3D measuring device, wherein each scan is captured from a different location within the environment, and wherein a first scan of the plurality of scans is registered with at least a second scan based on at least one common landmark, captured in the first scan and the second scan;

receiving an indication of an inaccurately registered landmark in at least one of the first scan and the second scan, the indication including a change in a position of the 3D measuring device to improve accuracy;

creating, based at least in part on the indication, a model to identify incorrect future registrations by analyzing the training data;

when in an operating mode, evaluating a registration of landmarks in live data received from the 3D measuring device during a scan of a second environment by using the AI system, and the model; and presenting, on the display, a result of the evaluating of the registration of landmarks during the scan of the second environment, the result identifying an accuracy level of the registration of landmarks and a change in a position of the 3D measuring device to improve accuracy.

2. The system of claim 1, wherein the 3D measuring device further includes a light source and a camera.

3. The system of claim 1, wherein the training phase uses supervised training.

4. The system of claim 1, wherein evaluating the registration of landmarks in the live data comprises classifying a registration of a landmark as one of accurate, inaccurate, and may be inaccurate.

5. The system of claim 4, wherein the result of the evaluating the registration of landmarks in the live data comprises a flag that is placed at the position of said landmark in the scan that is displayed.

6. The system of claim 5, wherein one or more visual attributes of the flag are based on the classifying the registration of the landmark.

7. The system of claim 1, wherein the at least one processor is integral with the 3D measuring device.

8. A method for automatically determining quality of registration of landmarks, the method comprising:

when an artificial intelligence (AI) system is in a training phase, receiving training data that comprises a plurality of scans of an environment captured by a three dimensional (3D) measuring device, wherein each scan is captured from a different location within the environment, and wherein a first scan of the plurality of scans is registered with at least a second scan based on at least one common landmark captured in the first scan and the second scan;

receiving an indication of an inaccurately registered landmark in at least one of the first scan and the second scan, the indication including a change in a position of the 3D measuring device to improve accuracy; and creating, based at least in part on the indication, a model to identify incorrect future registrations by analyzing the training data;

when the AI system is in an operating mode, evaluating a registration of landmarks in live data received from the 3D measuring device during a scan of a second environment by using the AI system and the model; and presenting, on a display, a result of the evaluating of the registration of landmarks during the scan of the second environment, the result identifying an accuracy level of the registration of landmarks and a change in a position of the 3D measuring device to improve accuracy.

9. The method of claim 8, wherein the training phase uses supervised training.

10. The method of claim 8, wherein evaluating the registration of a-landmarks in the live data comprises classifying a registration of a landmark as one of accurate, inaccurate, and may be inaccurate.

11. The method of claim 10, wherein the result of the evaluating the registration of landmarks in the live data comprises a flag that is placed at the position of said landmark in the scan that is displayed.

12. The method of claim 11, wherein one or more visual attributes of the flag are based on the classifying the registration of the landmark.

13. The method of claim 8, wherein the AI system is integral with the 3D measuring device.

14. The method of claim 8, further comprising:

receiving, from an operator, a selection of an option from the evaluation of the registration of the landmarks; and updating the model using the selection.

15. A non-transitory computer-readable medium having program instructions embodied therewith, the program instructions readable by a processor to cause the processor to perform a method for automatically determining quality of registration of landmarks, the method comprising:

when an artificial intelligence (AI) system is in a training phase, receiving training data that comprises a plurality of scans of an environment captured by a three-dimensional (3D) measuring device, wherein each scan is captured from a different location within the environment, and wherein a first scan of the plurality of scans is registered with at least a second scan based on at least one common landmark captured in the first scan and the second scan;

receiving an indication of an inaccurately registered landmark in at least one of the first scan and the second scan, the indication including a change in a position of the 3D measuring device to improve accuracy; and creating, based at least in part on the indication, a model to identify incorrect future registrations by analyzing the training data;

when the AI system is in an operating mode, evaluating a registration of landmarks in live data received from the 3D measuring device during a scan of a second environment by using the AI system and the model; and presenting, on a display, a result of the evaluating of the registration of landmarks during the scan of the second environment, the result identifying an accuracy level of the registration of landmarks and a change in a position of the 3D measuring device to improve accuracy.

16. The computer-readable medium of claim 15, wherein the training phase uses supervised training.

17. The computer-readable medium of claim 15, wherein evaluating the registration of landmarks in the live data comprises classifying a registration of a landmark as one of accurate, inaccurate, and may be inaccurate.

18. The computer-readable medium of claim 17, wherein the result of the evaluating the registration of landmarks in the live data comprises a flag that is placed at the position of said landmark in the scan that is displayed.

19. The computer-readable medium of claim 18, wherein one or more visual attributes of the flag are based on the classifying the registration of the landmark.

20. The computer-readable medium of claim 15, wherein the method further comprises:

receiving, from an operator, a selection of an option from the evaluating the registration of the landmarks; and
updating the model using the selection.

\* \* \* \* \*